United States Patent [19]
Crawford

[11] 3,882,711
[45] May 13, 1975

[54] ELECTRONIC TEMPERATURE SENSOR AND INDICATOR

[76] Inventor: Newton W. Crawford, 3751 Dell Rd., Carmichael, Calif. 95608

[22] Filed: Dec. 11, 1972

[21] Appl. No.: 313,840

[52] U.S. Cl. .......................... 73/362 AR; 307/310
[51] Int. Cl. ............................................. G01k 7/24
[58] Field of Search ................ 73/362 AR, 362 SC; 307/310

[56] References Cited
UNITED STATES PATENTS

| | | | |
|---|---|---|---|
| 2,271,975 | 2/1942 | Hall | 73/362 AR UX |
| 2,938,385 | 5/1960 | Mack et al. | 73/362 AR |
| 3,125,693 | 3/1964 | De Clue | 307/230 |
| 3,139,753 | 7/1964 | Brudner | 73/362 AR |
| 3,316,765 | 5/1967 | Trolunder et al. | 73/362 SC |
| 3,413,853 | 12/1968 | Rowell | 73/362 AR |
| 3,428,813 | 2/1969 | Hofmeister et al. | 307/310 X |
| 3,440,883 | 4/1969 | Lightner | 73/362 SC |
| 3,503,261 | 3/1970 | Riester et al. | 73/362 AR |
| 3,517,556 | 6/1970 | Barker | 73/362 AR |
| 3,552,210 | 1/1971 | Wright | 73/362 AR X |
| 3,575,053 | 4/1971 | Telinde | 73/362 AR |
| 3,780,585 | 12/1973 | Milo | 73/362 SC |

OTHER PUBLICATIONS

Regulador de Temperatura, In Revista Telegrafica Electronica, Oct., 1971; p. 590, TK-4-R59.

*Primary Examiner*—Richard C. Queisser
*Assistant Examiner*—Frederick Shoon
*Attorney, Agent, or Firm*—Lothrop & West

[57] ABSTRACT

A source of power and a readout resistor are connected in series between a first terminal and a second terminal. Across these terminals are connected a constant current diode in series with a zener diode. A connection between these diodes is made to the base of a transistor having its collector connected to the first terminal and its emitter connected to the base of another transistor in turn having its collector connected to the first terminal and its emitter connected to the primary terminal of a sensing element including a pair of thermistors in series and an additional thermistor in parallel with the first pair and itself connected in series with a resistor and to the secondary terminal of the sensing element. From that secondary terminal a connection is made to the base of a further transistor having its collector joined to the primary terminal and its emitter joined to the base of an additional transistor also having its collector joined to the primary sensing element terminal and having its emitter joined to the second terminal. A network of an additional thermistor in parallel with a further thermistor and a resistor in series is connected between the secondary terminal and the second terminal. A transient suppressor is connected between the first terminal and the second terminal.

9 Claims, 1 Drawing Figure

PATENTED MAY 13 1975　　　　　　　　　3,882,711
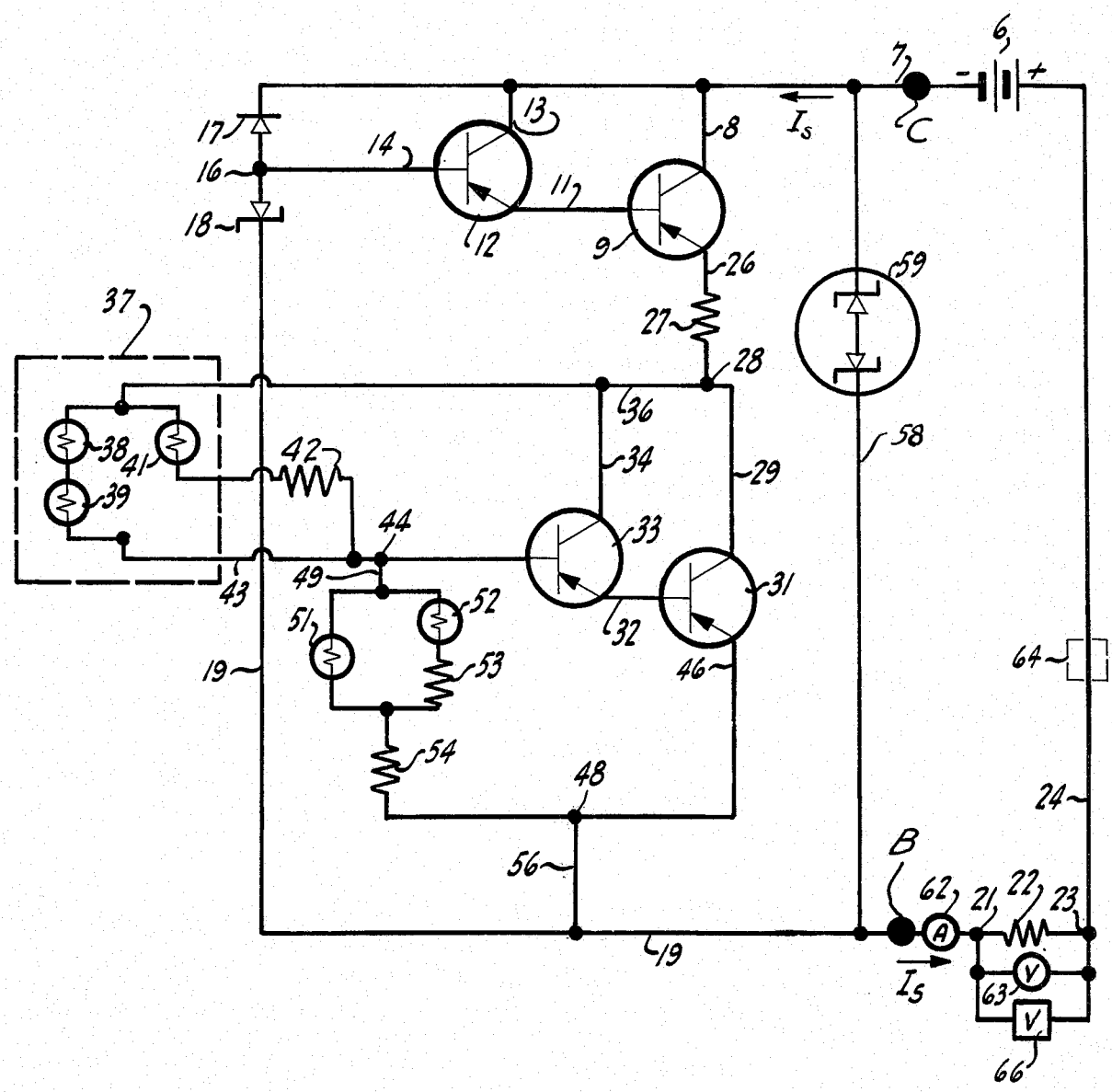

ELECTRONIC TEMPERATURE SENSOR AND INDICATOR

DESCRIPTION

There are numerous occasions upon which it is desired to note a particular physical value. This may be temperature in any of several temperature ranges, or may be pressure, or any other variable factor. For explanation herein reference is made to temperature simply as an example. Temperature at one point is sensed and affords an accurate indication of that temperature at a remote point. It is particularly desired to do this in a fashion so that the normally calibrated readout device, such as a milliammeter or a millivoltmeter will afford a numerical reading equivalent to the numerical value of the quantity being measured, such as temperature, but regardless of the decimal point. For example, if the remotely sensed temperature is 155 degrees Fahrenheit then the meter reading will also be 155. Further, since ambient conditions vary from time to time and may be distinctly different at one location than at another, it is desirable to afford some way of reducing or eliminating the effects of ambient temperature upon the circuitry used with the sensor.

An additional factor is the advisability of precluding overloading of the meter or meters and the circuits by affording some protection against transient or similar surges beyond the normal capacity of the device.

It is therefore an object of the invention to provide an electronic temperature sensor and indicator which affords a sensor for use at one location and a readout indicator for use at a different, remote location.

Another object of the invention is to provide such a device in which the non-measured, ambient temperature is generally compensated for.

A further object of the invention is to provide such a device in which the numerical value of the quantity sensed is indicated by the same numerical value in the readout device, differing only in the decimal point.

A further object of the invention is to provide an electronic device of the sort mentioned employing standard electronic elements.

Another object of the invention is to make the sensor current insensitive to terminal voltage variations.

Another object of the invention is to maintain original calibration without adjustments.

An additional object of the invention is to make the sensing element power low to ensure that sensing element heating will not affect the sensor current.

A further object of the invention is to provide a generally improved electronic temperature sensor and indicator.

Other objects, together with the foregoing, are attained in the embodiment of the invention described in the accompanying description and shown in the accompanying drawing which is a diagrammatic representation of an appropriate circuit.

While the device is disclosed and referred to herein as a temperature sensing device, it is also effective to sense other physical quantities and temperature is referred to herein primarily as an aid to description.

In the form of the device which has proved particularly successful in practice I have provided a DC power source 6, such as a battery, having at one end its negative connection or pole joined to a first terminal C from which a conductor 7 extends. At a convenient junction the conductor 7 a lead 8 extends to the collector of a first transistor 9. The base of the transistor 9 is joined by a conductor 11 to the emitter of a second transistor 12, the collector of which is joined by a lead 13 to the conductor 7. The transistors 9 and 12 can be considered as a first transistor group. The base of the second transistor 12 has a lead 14 extending to a junction 16 between and connected to a constant current diode 17, joined to the conductor 7, and an oppositely directed zener diode 18 having a conductor 19 joined to a second terminal B. One terminal 21 at one end of a readout resistor 22 is connected to the terminal B and the other terminal 23 of at the other end the readout resistor is joined by a conductor 24 to the opposite pole or other end of the power source 6.

The effect of the foregoing network is to maintain a constant sensor current $I_s$ by applying a constant voltage from the zener diode 18 across the base-emitter combination of the first transistor group including the first and second transistors 9 and 12. The constant current diode 17 reduces current variations in the zener diode 18.

The structure to the right of the terminals B and C may be at one physical location while all of the structure to the left of the terminals B and C, which I call the sensor, may be at a remote physical location.

The emitter of the first transistor 9 is joined by a lead 26 and through a resistor 27 to a junction 28. A conductor 29 extends from the junction 28 to the collector of a third transistor 31, the base of which is joined by a lead 32 to the emitter of a fourth transistor 33, the collector of which is joined by a connector 34 to a conductor 36 secured to the junction 28. The transistors 31 and 33 can be considered as a second transistor group. The conductor 36 extends to a connection with a sensing element, generally designated 37 and forming part of the sensor itself. The sensing element 37 includes a first thermistor 38 and a second thermistor 39 in series (considered as a first thermistor group) and connected in parallel with a third thermistor 41 (considered as a second thermistor group). Outside the sensing element the third thermistor 41 is joined in series with a resistor 42 connected to a conductor 43 joined to the base of the fourth transistor 33. The sensing element series connected thermistors 38 and 39 are joined in parallel with the series connected thermistor 41 and the resistor 42 to the conductor 36 and to the conductor 43 which includes junction 44.

From the emitter of the third transistor 31 there is a connector 46 extending to a junction 48. Connected to the second junction 44 and the junction 48 is a temperature compensating network. This involves a conductor 49 joined to the junction 44 and having two branches. One branch connects to end of a fourth thermistor 51 and the other branch connects in parallel to one end of a fifth thermistor 52 series with the other end of which one end of a resistor 53 is connected. This compensating network also includes a resistor 54 at one end connected to the other end of the thermistor 51 and to the other end of the resistor 53. The other end of the resistor 54 is connected to the junction 48. A lead 56 connects the junction 48 with the conductor 19 and so to one end 21 of the readout resistor 22.

The total resistance of the sensor network, i.e., of the third and fourth transistors (31 and 33-the second transistor group) and of the temperature responsive and compensating networks (thermistors 38, 39, 41 and 51 and 52) and the related resistors 27, 42, 53 and 54, acts as a feedback resistor for the supply of the constant current $I_s$ which is determined by this total resistance.

The thermistors 38, 39 and 41 of the sensing element 37 are temperature sensitive to the temperature being measured or sensed. In combination with the external resistor 42 they adjust the base current in the fourth transistor 33. The collector-emitter current of the transistor 33 adjusts the base-emitter current of the third transistor 31. The combination of the fourth transistor 33 and the third transistor 31 reduces the current in the thermistors 38, 39 and 41 so that self-heating temperature effects of those thermistors are very low and so do not appear in the sensor current $I_s$. The combination of the three thermistors 38, 39 and 41 together with the resistor 42 provides the proper and desired numerical identity or relationship of the temperature sensed and the sensor current $I_s$ as follows:

$$I_s = 0.1T$$

wherein $I_s$ is the sensor current in milliamperes and T is the sensed temperature in degrees Fahrenheit.

In order to reduce transients or surges between the first and second terminals C and B there is joined to those terminals a conductor 58 including a surge suppressor 59.

As appropriate ways for utilizing the electrical condition of the readout resistor 22, there can be provided either a voltage indicating device or an amperage indicating device. For example, if an ammeter is preferred there is provided a milliammeter 62 connected in series between the terminals B and the terminal 21 of the readout resistor 22. If a voltage indication is desired then a voltmeter, such as millivoltmeter 63, is connected across the terminals 21 and 23 of the readout resistor 22. It is to be understood that the ammeter 62 can be supplemented or replaced by any suitable remote device 64 controlled in accordance with the current to afford an instantaneous showing or record of the current $T_s$ or to actuate some extraneous structure. Similarly, there can be provided in place of the voltmeter 63 or in addition thereto a structure 66 responsive to voltage drop across the readout resistor 22 either to record instantaneous values thereof or to perform some extraneous function.

In the operation of the circuitry specified the power source affords a known voltage and adequate current for the connected mechanism. The purpose of the constant current diode 17 and the first zener diode 18 is to maintain a substantially constant voltage between the base of the second transistor 12 and the emitter of the first transistor 9. The thermistor-resistor network associated with the sensing element 37 as well as all of the rest of the sensor left of the terminals B and C is disposed or located at the point whereat the temperature is to be sensed. The combination of thermistors 38 and 39 and the thermistors 41 and the resistor 42 is effective to afford a relatively small current to the base of the fourth transistor 33 for amplification and inclusion with the current flowing through the third transistor 31 and through the readout resistor 22. This current, the temperature-varied current in the sensing element 37, is the governing portion of the total current through the readout resistor that affords the temperature indication.

Since the various components of the circuit have ambient temperature responsive characteristics and since only the temperature characteristics of the sensing element 37 are to be measured, there is provided a compensating network to overcome or virtually eliminate the effects of ambient temperature on all of the circuitry except for the sensing element 37. That is accomplished in the network including thermistors 51 and 52 and the resistor 53 in connection also with the resistor 54. The output of this network tends to be in the opposite direction from the ambient temperature effect on all of the circuitry except for the sensing element 37 so that any local temperature effects in the circuit, except for the sensing element 37, are compensated for.

Should there for any reason be sudden transients or surges in the circuit they are effectively blocked from causing difficulty by the transient suppressor 59.

In one example of an embodiment of the invention as shown in the drawing, the components are identified as follows:

| Number | Device | Manufacturer | Part Number |
| --- | --- | --- | --- |
| 6 | Power supply | | 12V dc |
| 9 | Transistor | Motorola | 2N4234 |
| 12 | Transistor | Texas Instruments | 2N2906 |
| 17 | Constant Current Diode | Motorola | MCL1301 |
| 18 | Zener Diode 6.2V. | Centralab | 1N821 |
| 22 | Resistor | General Resistance | 16C32DF 10 OHMS 1% |
| 27 | Resistor | Dale | 151 OHMS ¼W 1% |
| 31 | Transistor | Motorola | 2N4234 |
| 33 | Transistor | Texas Instruments | 2N2906 |
| 38 | Thermistor | Veco | 51A84 |
| 39 | Thermistor | Veco | 42A73 |
| 41 | Thermistor | Veco | 31A11 |
| 42 | Resistor | Dale | 56000 OHMS ½W 1% |
| 51 | Thermistor | Veco | 44A3 |
| 52 | Thermistor | Veco | 24A16 |
| 53 | Resistor | Dale | 13000 OHMS ½W 1% |
| 54 | Resistor | Dale | 5100 OHMS ½W 1% |
| 59 | Transient suppressor | Motorola | MP25-32A |

What is claimed is:

1. Electronic temperature measuring apparatus for providing an electrical current directly proportional to sensed temperatures comprising:
   a. a D.C. power source,
   b. means for regulating voltage from said power source to provide a regulated voltage output,
   c. first transistor means having an emitter, base and collector, said emitter and collector connected to said regulated voltage output,
   d. temperature measuring means having an effective electrical resistance responsive to the sensed temperature, said temperature measuring means connected to said collector and coupled to the base of said first transistor means whereby the effective resistance of said temperature measuring means controls current through the emitter-collector circuit of said first transistor means, thereby defining an effective resistance versus current characteristic function, e. said temperature measuring means having an effective resistance versus temperature characteristic function approximately equal to said effective resistance versus current characteristic function, f. means connected to the emitter of said first transistor means and coupled to said base for biasing the emitter-base junction of said first transistor means, and g. means responsive to the current through said first transistor means for measuring the sensed temperature.

2. Electronic temperature measuring apparatus as recited in claim 1 wherein said temperature measuring means comprises:

a. a first circuit branch having thermistor means therein, and b. a second circuit branch in parallel with said first branch and having therein additional thermistor means in series with resistor means.

3. Electronic temperature measuring apparatus as recited in claim 2 wherein said thermistor means in said first branch comprises first and second thermistor elements.

4. Electronic temperature measuring apparatus as recited in claim 1 wherein said D.C. power source has first and second terminals and said voltage regulating means comprises:

a. second transistor means having an emitter, base and collector, the emitter of said second transistor means connected to the collector of said first transistor means, and the collector of said second transistor means connected to said first terminal of said D.C. power source, b. a constant voltage diode having one side coupled to said first terminal of said D.C. power source and to the base of said second transistor means and the other side connected to the second terminal of said D.C. source and said emitter of said first transistor means.

5. Electronic temperature measuring apparatus as recited in claim 4 wherein said constant voltage diode comprises a zener diode.

6. Electronic temperature measuring apparatus as recited in claim 1 wherein said means responsive to the current through said first transistor means comprises an ammeter.

7. Electronic temperature measuring apparatus as recited in claim 1 wherein said means responsive to the current through said first transistor means comprises a readout resistor and a voltmeter connected across said readout resistor.

8. Electronic temperature measuring apparatus as recited in claim 1 wherein said biasing means further comprises an ambient temperature compensating network.

9. Electronic temperature measuring apparatus as recited in claim 8 wherein said compensating network comprises thermistor means.

* * * * *